US012627524B2

(12) United States Patent
Jinno et al.

(10) Patent No.: US 12,627,524 B2
(45) Date of Patent: May 12, 2026

(54) AIR TREATMENT APPARATUS

(71) Applicant: DAIKIN INDUSTRIES, LTD., Osaka (JP)

(72) Inventors: Hiroaki Jinno, Osaka (JP); Takafumi Ito, Osaka (JP); Mitsuya Uchida, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 304 days.

(21) Appl. No.: 18/195,573

(22) Filed: May 10, 2023

(65) Prior Publication Data

US 2023/0283932 A1      Sep. 7, 2023

Related U.S. Application Data

(63) Continuation of application No. PCT/JP2021/037269, filed on Oct. 8, 2021.

(30) Foreign Application Priority Data

Dec. 24, 2020    (JP) ................................. 2020-215117

(51) Int. Cl.
*H04L 12/46* (2006.01)
*G06F 13/40* (2006.01)
(Continued)

(52) U.S. Cl.
CPC .......... *H04L 12/46* (2013.01); *G06F 13/4004* (2013.01); *G06F 13/4282* (2013.01); *H04L 2012/40234* (2013.01)

(58) Field of Classification Search
CPC ............. G06F 13/4004; G06F 13/4282; H04L 2012/40234; H04L 12/46
See application file for complete search history.

(56) References Cited

U.S. PATENT DOCUMENTS 9,191,467 B2 * 11/2015 Triess ..................... H04L 12/66
9,429,463 B2 * 8/2016 Hanson ..................... G01L 1/06
(Continued)

FOREIGN PATENT DOCUMENTS

CN        102687411 A      9/2012
CN        210605698 U      5/2020
(Continued)

OTHER PUBLICATIONS

International Search Report (PCT/ISA/210) issued in PCT/JP2021/037269 mailed on Dec. 21, 2021.
(Continued)

*Primary Examiner* — Kevin C. Harper
(74) *Attorney, Agent, or Firm* — Birch, Stewart, Kolasch & Birch, LLP

(57) ABSTRACT

An air treatment apparatus for conditioning air or providing ventilation of air includes: a casing of an apparatus main body; a first sensor disposed outside the casing and configured to output a signal in conformity with a first communication standard; a conversion unit configured to convert the signal output from the first sensor into a signal conforming to a second communication standard higher in tolerance to noise than the first communication standard and to output the signal thus converted; and a main control unit disposed in the casing and configured to receive the signal output from the conversion unit.

10 Claims, 6 Drawing Sheets

(51) Int. Cl.
   *G06F 13/42*      (2006.01)
   *H04L 12/40*      (2006.01)

(56)           References Cited

U.S. PATENT DOCUMENTS

| | | | |
|---|---|---|---|
| 2005/0001578 A1 | 1/2005 | Sunaga et al. | |
| 2005/0265344 A1* | 12/2005 | Harris | H04L 12/40032 |
| | | | 370/392 |
| 2012/0277916 A1* | 11/2012 | Delorme | B60H 1/0073 |
| | | | 700/276 |
| 2012/0281782 A1 | 11/2012 | Matsutani | |
| 2015/0323207 A1 | 11/2015 | Son et al. | |
| 2017/0168976 A1* | 6/2017 | Yost | G06F 13/4282 |
| 2020/0386668 A1* | 12/2020 | Olson | G01N 25/66 |
| 2021/0006290 A1 | 1/2021 | Doumae et al. | |
| 2021/0310682 A1 | 10/2021 | Yamada et al. | |
| 2023/0050032 A1* | 2/2023 | Chewter | B60H 1/0073 |

FOREIGN PATENT DOCUMENTS

| | | | |
|---|---|---|---|
| JP | 2000-230743 A | 8/2000 | |
| JP | 2004-317015 A | 11/2004 | |
| JP | 2004-345533 A | 12/2004 | |
| JP | 2005-55058 A | 3/2005 | |
| JP | 2011-113351 A | 6/2011 | |
| JP | 2011-242085 A | 12/2011 | |
| JP | 2015-183936 A | 10/2015 | |
| JP | 2017-180996 A | 10/2017 | |
| JP | 2017-181314 A | 10/2017 | |
| JP | 2018-81723 A | 5/2018 | |
| JP | 6511457 B2 | 5/2019 | |
| JP | 2019-152426 A | 9/2019 | |
| JP | 2020-118438 A | 8/2020 | |
| KR | 10-2019-0092990 A | 8/2019 | |

OTHER PUBLICATIONS

Extended European Search Report for corresponding European Application No. 21909887.8, dated Apr. 26, 2024.

International Preliminary Report on Patentability and English translation of the Written Opinion of the International Searching Authority for International Application No. PCT/JP2021/037269, dated Jul. 6, 2023.

\* cited by examiner

AIR TREATMENT APPARATUS

CROSS REFERENCE TO RELATED APPLICATIONS

This application is a Continuation of PCT International Application No. PCT/JP2021/037269, filed on Oct. 8, 2021, which claims priority under 35 U.S.C. 119 (a) to Patent Application No. 2020-215117, filed in Japan on Dec. 24, 2020, all of which are hereby expressly incorporated by reference into the present application.

TECHNICAL FIELD

The present disclosure relates to sensor connections in an air treatment apparatus. The term "air treatment apparatus" as used herein generally refers to an apparatus configured to condition air or to provide ventilation of air.

BACKGROUND ART

Operations of an air conditioner are controlled based on, for example, a temperature and a humidity in a space to be subjected to air conditioning, a temperature of outside air, and information from various sensors. With regard to, for example, an indoor unit for business use, every component is not necessarily accommodated in a casing that forms an outer appearance of the indoor unit. For example, some sensors are provided outside the casing. A communication line (a cable) between the casing and a sensor outside the casing is considerably longer in length than that between the casing and a sensor in the casing, depending on installation sites.

At present, an inter-integrated circuit (I2C) is generally in the mainstream as to a communication standard for transmitting an output from a sensor; however, other standards are also used. A control board which is a main control unit of the air conditioner needs to be designed in accordance with different communication standards for the sensors. Meanwhile, it is preferred that the control board be standardized from the viewpoint of improvements in production efficiency and reliability (see Patent Literature 1).

CITATION LIST

Patent Literature

PATENT LITERATURE 1: Japanese Laid-Open Patent Publication No. 2017-180996

SUMMARY

An air treatment apparatus for conditioning air or providing ventilation of air, the air treatment apparatus including: a casing of an apparatus main body; a first sensor disposed outside the casing and configured to output a signal in conformity with a first communication standard; a conversion unit configured to convert the signal output from the first sensor into a signal conforming to a second communication standard higher in tolerance to noise than the first communication standard and to output the signal thus converted; and a main control unit disposed in the casing and configured to receive the signal output from the conversion unit.

DETAILED DESCRIPTION

Embodiments of the present disclosure will be described below.

First, a description will be given of an outline of a configuration of an air conditioner which is an example of an air treatment apparatus and includes a refrigerant circuit.

Refrigerant Circuit

Figure 6:
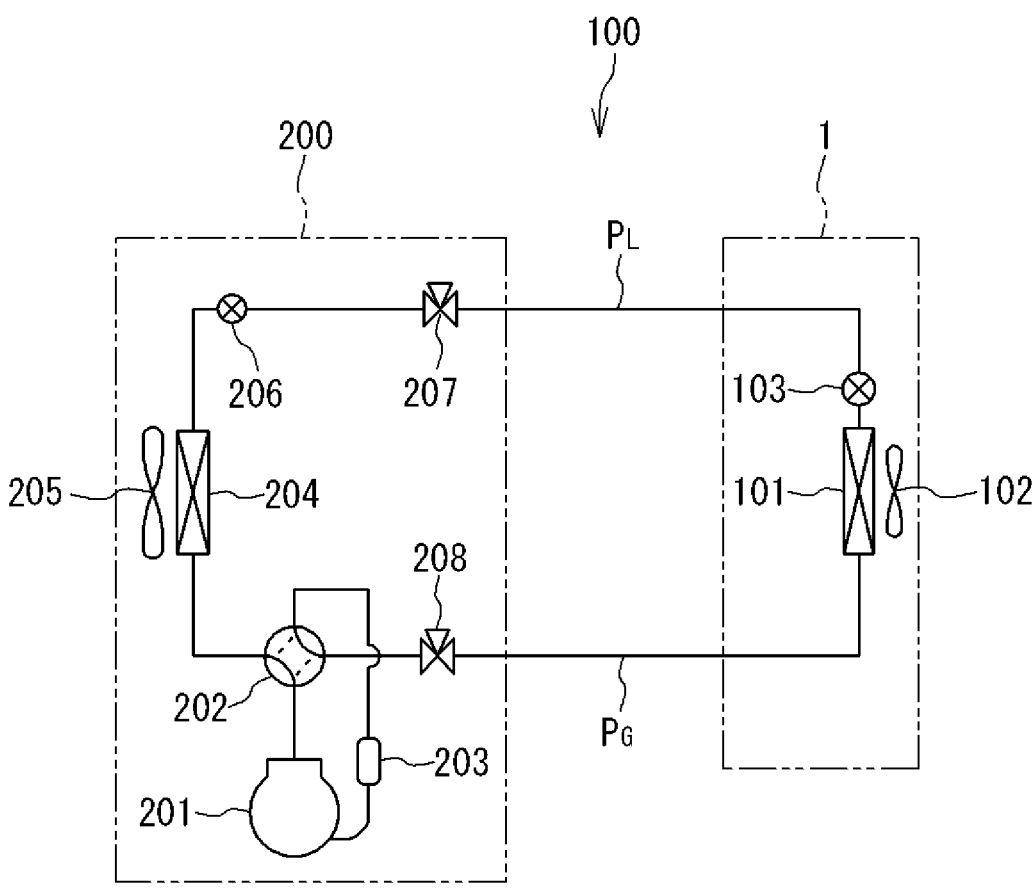
FIG. 6 is a diagram illustrating an exemplary refrigerant circuit of an air conditioner.

FIG. 6 is a diagram illustrating an exemplary refrigerant circuit of an air conditioner 100. As illustrated in FIG. 6, an outdoor unit 200 which is a heat source-side unit includes a compressor 201, a four-way switching valve 202, an accumulator 203, a heat exchanger 204, a fan 205, an expansion valve 206, a liquid-side interruption valve 207, and a gas-side interruption valve 208. An indoor unit 1 which is a utilization-side unit includes a heat exchanger 101, a fan 102, and an expansion valve 103. The outdoor unit 200 and the indoor unit 1 are connected to each other with refrigerant pipes $P_L$ and $P_G$ to constitute a refrigerant circuit as illustrated in FIG. 6. Each of the valves 207 and 208 is an electric valve. For example, each of the valves 207 and 208 may be an electronic expansion valve.

During a cooling operation, the four-way switching valve 202 forms an internal flow path indicated by a solid line. A refrigerant discharged from the compressor 201 thus passes through the four-way switching valve 202, the heat exchanger 204, the expansion valve 206, the open interruption valve 207, the expansion valve 103, the heat exchanger 101, the open interruption valve 208, the four-way switching valve 202, and the accumulator 203, and then returns to the compressor 201. At this time, the heat exchanger 204 of the outdoor unit 200 functions as a condenser while the heat exchanger 101 of the indoor unit 1 functions as an evaporator.

During a heating operation, the four-way switching valve 202 forms an internal flow path indicated by a dotted line. The refrigerant discharged from the compressor 201 thus passes through the four-way switching valve 202, the open interruption valve 208, the heat exchanger 101, the expansion valve 103, the open interruption valve 207, the expansion valve 206, the heat exchanger 204, the four-way switching valve 202, and the accumulator 203, and then returns to the compressor 201. At this time, the heat exchanger 204 of the outdoor unit 200 functions as an evaporator while the heat exchanger 101 of the indoor unit 1 functions as a condenser.

Next, a description will be given of sensor connections in the air treatment apparatus according to the present disclosure.

First Embodiment

Figure 1:
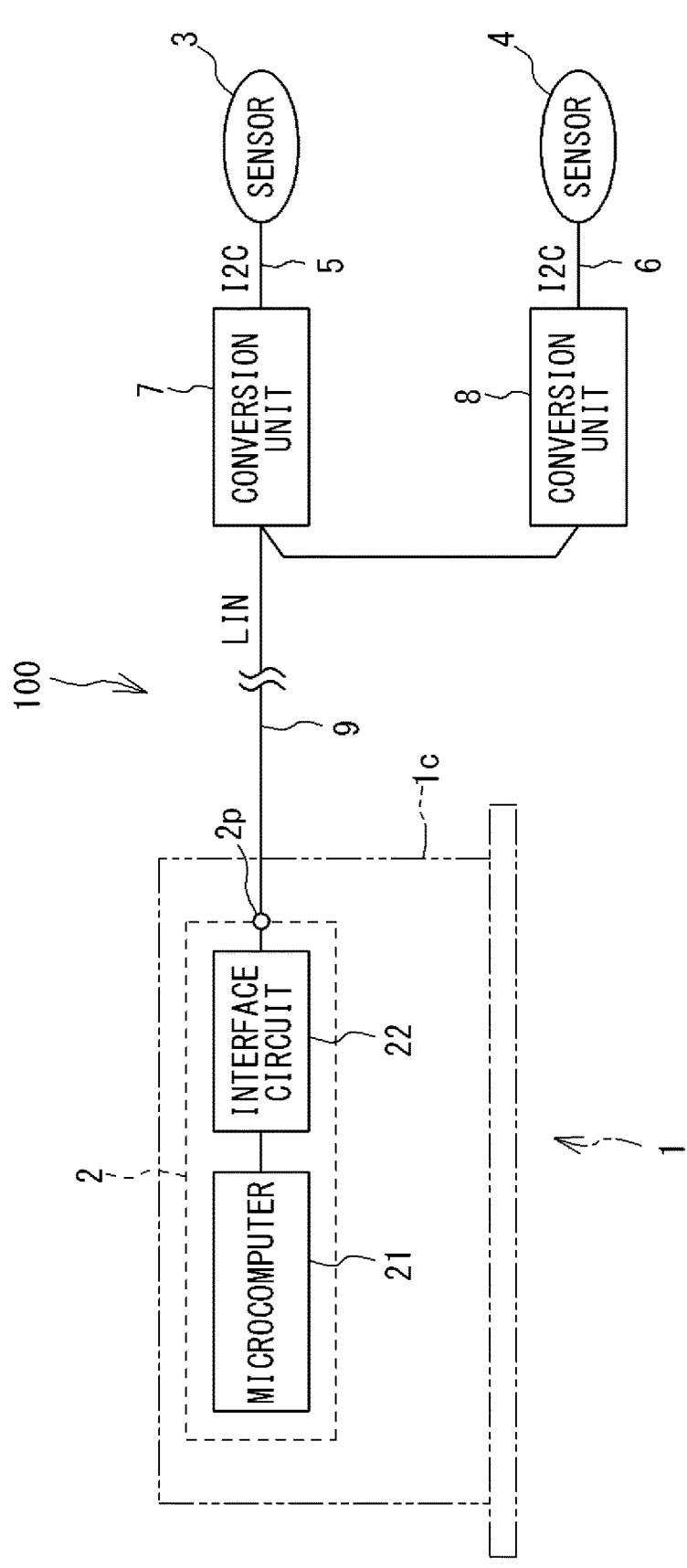
FIG. 1 is a connection diagram illustrating a first embodiment of an air treatment apparatus from the viewpoint of sensor connections.

FIG. 1 is a connection diagram illustrating a first embodiment of an air treatment apparatus 100 from the viewpoint of sensor connections. FIG. 1 schematically illustrates a basic concept of the present disclosure in a simplified manner. As described above, the term "air treatment apparatus" generally refers to an apparatus configured to condition air or to provide ventilation of air. FIG. 1 illustrates an indoor unit 1 of an air conditioner which is an example of the air treatment apparatus 100, and the indoor unit 1 is designed to be embedded in a ceiling. The indoor unit may alternatively be designed to be, for example, mounted on a floor, hung on a wall, or suspended from a ceiling.

In FIG. 1, a main control unit 2 is disposed in a casing 1*c* of the indoor unit 1. The main control unit 2 is a control board including a microcomputer 21 and an interface circuit 22 connected to the microcomputer 21. The microcomputer 21 includes a central processing unit (CPU), a clock, a memory, an internal interface, and the like. The main control unit 2 includes an input port 2*p* for receiving a sensor signal.

The interface circuit 22 converts a signal transmitted in conformity with a local Internet network (LIN) as a communication standard into a signal conforming to a universal asynchronous receiver/transmitter (UART) or an I2C, and then inputs the converted signal to the microcomputer 21.

The indoor unit 1 includes various sensors such as a temperature sensor, a humidity sensor, a $CO_2$ sensor, an infrared sensor, and an indoor air quality sensor (IAQ sensor). These sensors include a sensor disposed in the casing 1*c* or on a surface of the casing 1*c*, and a sensor disposed outside the casing 1*c* and located away from the casing 1*c*. FIG. 1 illustrates sensors 3 and 4 disposed outside the casing 1*c*. The number of sensors disposed outside the casing 1*c* is two in this embodiment. However, the number of sensors is merely an example. For example, the number of sensors disposed outside the casing 1*c* may be one or may be three or more.

The sensors 3 and 4 are each configured to output a signal in conformity with the I2C. Since the I2C is susceptible to an intrusion of external noise, communication lines 5 and 6 are preferably short in length as much as possible. For example, the lengths of the communication lines 5 and 6 need to be reduced to approximately 1.2 m at maximum. The sensor 3 is connected to a conversion unit 7. The sensor 4 is connected to a conversion unit 8. The conversion unit 7 is configured to convert a signal conforming to the I2C into a signal conforming to the LIN. The same applies to the conversion unit 8. The conversion units 7 and 8 have output sides (i.e., left sides of the conversion units 7 and 8 in FIG. 1) that are daisy-chained in parallel.

The conversion units 7 and 8 are each connected to the input port 2*p* of the main control unit 2 via a communication line 9 for the LIN. The LIN is higher in tolerance to noise than the I2C. The communication line 9 is therefore extendable by 40 m in length at maximum. The conversion unit 7 and the sensor 3 receive a required control power supply voltage (e.g., 5 V DC) from the main control unit 2 through the communication lines 9 and 5. The conversion unit 8 and the sensor 4 receive a required control power supply voltage (e.g., 5 V DC) from the main control unit 2 through the communication lines 9 and 6.

As described above, the conversion units 7 and 8 allow the sensors 3 and 4 to output a signal in conformity with the I2C, and allow the main control unit 2 to receive a signal conforming to the LIN. The communication line 9 for the LIN higher in tolerance to noise than the I2C is present on the communication lines 5 and 6 for signal transmission. This configuration thus enables reduction in influence of external noise. Shortening the communication lines 5 and 6 for the I2C as much as possible such that the communication line 9 for the LIN occupies most of the total required length enables more effective reduction in influence of external noise.

Specific Example 1 of Connection Diagram

Figure 2:
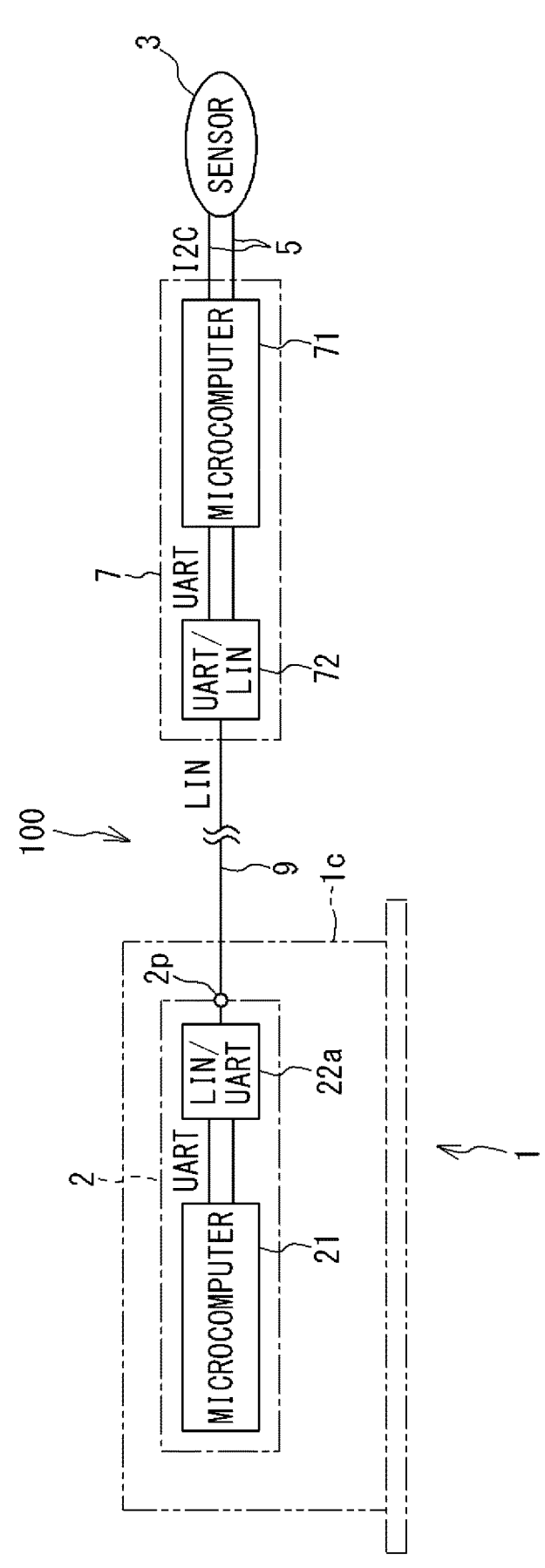
FIG. 2 is a more specific diagram of the connection diagram of FIG. 1 and illustrates a first example.

FIG. 2 is a more specific diagram of the connection diagram of FIG. 1 and illustrates a first example. FIG. 2 illustrates only one of the sensor connections. As illustrated in FIG. 2, the conversion unit 7 includes a single substrate, a microcomputer 71, and a conversion circuit 72 for UART-to-LIN conversion. The microcomputer 71 and the conversion circuit 72 are mounted on the single substrate. The microcomputer 71 includes a CPU, a clock, a memory, an internal interface, and the like. A computer program for I2C-to-DART conversion is written in the microcomputer 71.

The microcomputer 71 and the conversion circuit 72 are connected to each other with two transmission lines, through which a signal conforming to the UART is transmitted, on the substrate. The microcomputer 71 is connected to the sensor 3 with communication lines 5 through which a signal conforming to the I2C is transmitted.

The main control unit 2 includes a single substrate, the microcomputer 21, a conversion circuit 22*a* for LIN-to-UART conversion (corresponding to the interface circuit 22 in FIG. 1), and the input port 2*p* for receiving a sensor signal. The microcomputer 21 and the conversion circuit 22*a* are mounted on the single substrate. The microcomputer 21 and the conversion circuit 22*a* are connected to each other with two transmission lines, through which a signal conforming to the UART is transmitted, on the substrate.

The sensor-side conversion circuit 72 for UART-to-LIN conversion and the main control unit-side input port 2*p* connected to the conversion circuit 22*a* for LIN-to-DART conversion are connected to each other with the communication line 9 (e.g., a flat cable or a multicore cable) for the LIN. The required number of communication lines 9 is one, which simplifies and facilitates construction.

According to the configuration illustrated in FIG. 2, the sensor 3 outputs a signal in conformity with the I2C, and then the microcomputer 71 converts this signal into a signal conforming to the UART. The conversion circuit 72 then converts the signal conforming to the UART into a signal conforming to the LIN, and transmits the converted signal to the main control unit 2 through the communication line 9. In the main control unit 2, the conversion circuit 22*a* converts the signal conforming to the LIN into a signal conforming to the UART. The microcomputer 21 then receives the signal conforming to the UART.

Since the sensor-side conversion unit 7 includes the microcomputer 71, the air treatment apparatus 100 is capable of facilitating addressing different sensor-side communication standards, by changing a computer program in the conversion unit 7. In addition, in a case where the air treatment apparatus 100 includes a plurality of sensors which are equal in communication standard to each other or a plurality of sensors some of which are different in communication standard from the remaining sensors, the air treatment apparatus 100 enables conversion corresponding to each communication standard and also enables identification of each sensor based on its address. The air treatment apparatus 100 is therefore capable of facilitating signal conversion according to a sensor. The main control unit 2 has no necessity of design change according to a difference in communication standard among the sensors.

In the case where the conversion unit includes the micro-computer, the conversion unit is connectable to the main control unit with one communication line (e.g., a flat cable or a multicore cable), which simplifies and facilitates construction.

Specific Example 2 of Connection Diagram

Figure 3:
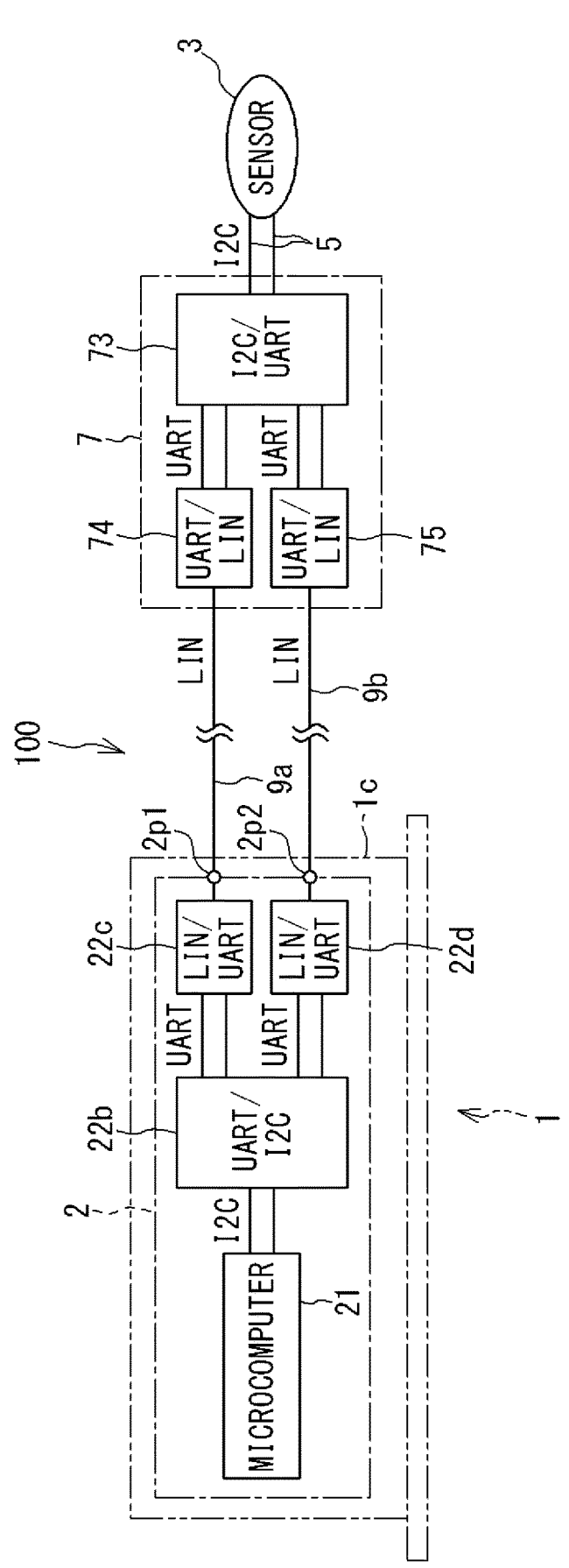
FIG. 3 is a more specific diagram of the connection diagram of FIG. 1 and illustrates a second example.

FIG. 3 is a more specific diagram of the connection diagram of FIG. 1 and illustrates a second example. FIG. 3 illustrates only one of the sensor connections. As illustrated in FIG. 3, the conversion unit 7 includes a single substrate, a conversion circuit 73 for I2C-to-UART conversion, and conversion circuits 74 and 75 for UART-to-LIN conversion. The conversion circuit 73 and the conversion circuits 74 and 75 are mounted on the single substrate. A signal output from the conversion circuit 73 for I2C-to-UART conversion is divided into two and then transmitted through two routes.

The conversion circuit 73 for I2C-to-UART conversion and the conversion circuit 74 for UART-to-LIN conversion are connected to each other with two transmission lines, through which a signal conforming to the UART is transmitted, on the substrate. Likewise, the conversion circuit 73 for I2C-to-UART conversion and the conversion circuit 75 for UART-to-LIN conversion are connected to each other with two transmission lines, through which a signal conforming to the UART is transmitted, on the substrate. The conversion circuit 73 for I2C-to-UART conversion is connected to the sensor 3 with communication lines 5 through which a signal conforming to the I2C is transmitted.

The main control unit 2 includes the single substrate, the microcomputer 21, a conversion circuit 22b for UART-to-I2C conversion, two conversion circuits 22c and 22d for LIN-to-UART conversion, and input ports 2p1 and 2p2 for receiving sensor signals. The microcomputer 21, the conversion circuit 22b, and the conversion circuits 22c and 22d are mounted on the single substrate. These conversion circuits 22b, 22c, and 22d each correspond to the interface circuit 22 illustrated in FIG. 1.

The conversion circuit 22b for UART-to-I2C conversion and the conversion circuit 22c for LIN-to-UART conversion are connected to each other with two transmission lines, through which a signal conforming to the UART is transmitted, on the substrate. Likewise, the conversion circuit 22b for UART-to-I2C conversion and the conversion circuit 22d for LIN-to-UART conversion are connected to each other with two transmission lines, through which a signal conforming to UART is transmitted, on the substrate. The microcomputer 21 and the conversion circuit 22b are connected to each other with two transmission lines, through which a signal conforming to the I2C is transmitted, on the substrate.

The sensor-side conversion circuit 74 for UART-to-LIN conversion and the main control unit-side input port 2p1 connected to the conversion circuit 22c for LIN-to-UART conversion are connected to each other with a communication line 9a (e.g., a flat cable or a multi core cable) for the LIN. Likewise, the sensor-side conversion circuit 75 for UART-to-LIN conversion and the main control unit-side input port 2p2 connected to the conversion circuit 22d for LIN-to-UART conversion are connected to each other with a communication line 9b (e.g., a flat cable or a multicore cable) for the LIN.

According to the configuration illustrated in FIG. 3, the sensor 3 outputs a signal in conformity with the I2C, and then the conversion circuit 73 for I2C-to-UART conversion converts this signal into a signal conforming to the UART.

The conversion circuits 74 and 75 for UART-to-LIN conversion convert the signals conforming to the UART into signals conforming to the LIN, and transmit the converted signals to the main control unit 2 through the communication lines 9a and 9b. In the main control unit 2, the conversion circuits 22c and 22d for LIN-to-UART conversion convert the signals conforming to the LIN into signals conforming to the UART. The conversion circuit 22b receives the signals conforming to the UART via two routes, and converts the signals into signals conforming to the I2C. The microcomputer 21 then receives the signals conforming to the I2C.

As described above, the conversion unit 7 illustrated in FIG. 3 converts, with a hardware circuit, a signal output from the sensor and conforming to the I2C into a signal conforming to the LIN. In this case, the conversion unit 7 is used for only the sensor 3 for the I2C. This configuration however eliminates a necessity of software design to be required in a case where a microcomputer is used.

Second Embodiment

Figure 4:
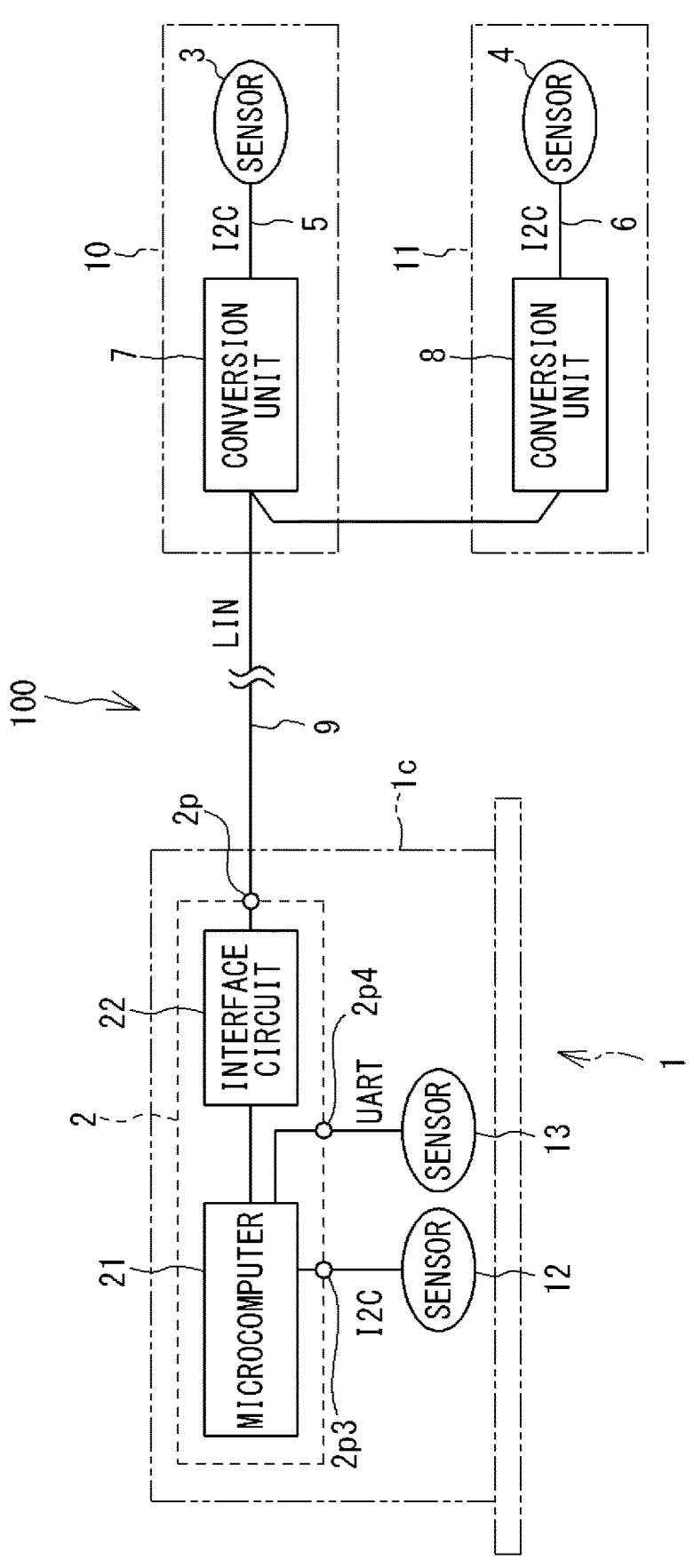
FIG. 4 is a connection diagram illustrating a second embodiment of an air treatment apparatus from the viewpoint of sensor connections.

FIG. 4 is a connection diagram illustrating a second embodiment of an air treatment apparatus 100 from the viewpoint of sensor connections. The air treatment apparatus 100 illustrated in FIG. 4 is different from the air treatment apparatus 100 illustrated in FIG. 1 in the following respects. That is, a conversion unit 7 and a sensor 3 are mounted on a single substrate or are accommodated in a single casing to constitute a sensor unit 10. Likewise, a conversion unit 8 and a sensor 4 are mounted on a single substrate or are accommodated in a single casing to constitute a sensor unit 11. As used herein, the definition "accommodated in a single casing" means that a conversion unit and a sensor are accommodated in, for example, a resin casing to constitute a single unit. This unitization causes the sensor 3 and the conversion unit 7 to come close to each other and to be fixed physically, thereby more effectively reducing an influence of external noise between the conversion unit 7 and the sensor 3. The same applies to the sensor 4 and the conversion unit 8.

A main control unit 2 illustrated in FIG. 4 includes an input port 2p for receiving an external signal conforming to the LIN and input ports 2p3 and 2p4 for connecting sensors 12 and 13 disposed on an outer surface of a casing 1c or in the casing 1c. The input port 2p3 is a port for a signal conforming to the I2C, and is connected to a microcomputer 21. The input port 2p4 is a port for a signal conforming to the UART, and is connected to the microcomputer 21. The sensor 12 is configured to output a signal in conformity with the I2C. The sensor 13 is configured to output a signal in conformity with the UART.

The input ports 2p3 and 2p4 enable direct connections between the main control unit 2 and the various sensors located near the main control unit 2, in addition to connections between the main control unit 2 and the various sensors with the conversion units 7 and 8 interposed therebetween. The input ports 2p3 and 2p4 also enable sensor connections conforming to the communication standards of different types (e.g., I2C, UART) inside and outside the casing 1c.

Third Embodiment

Figure 5:
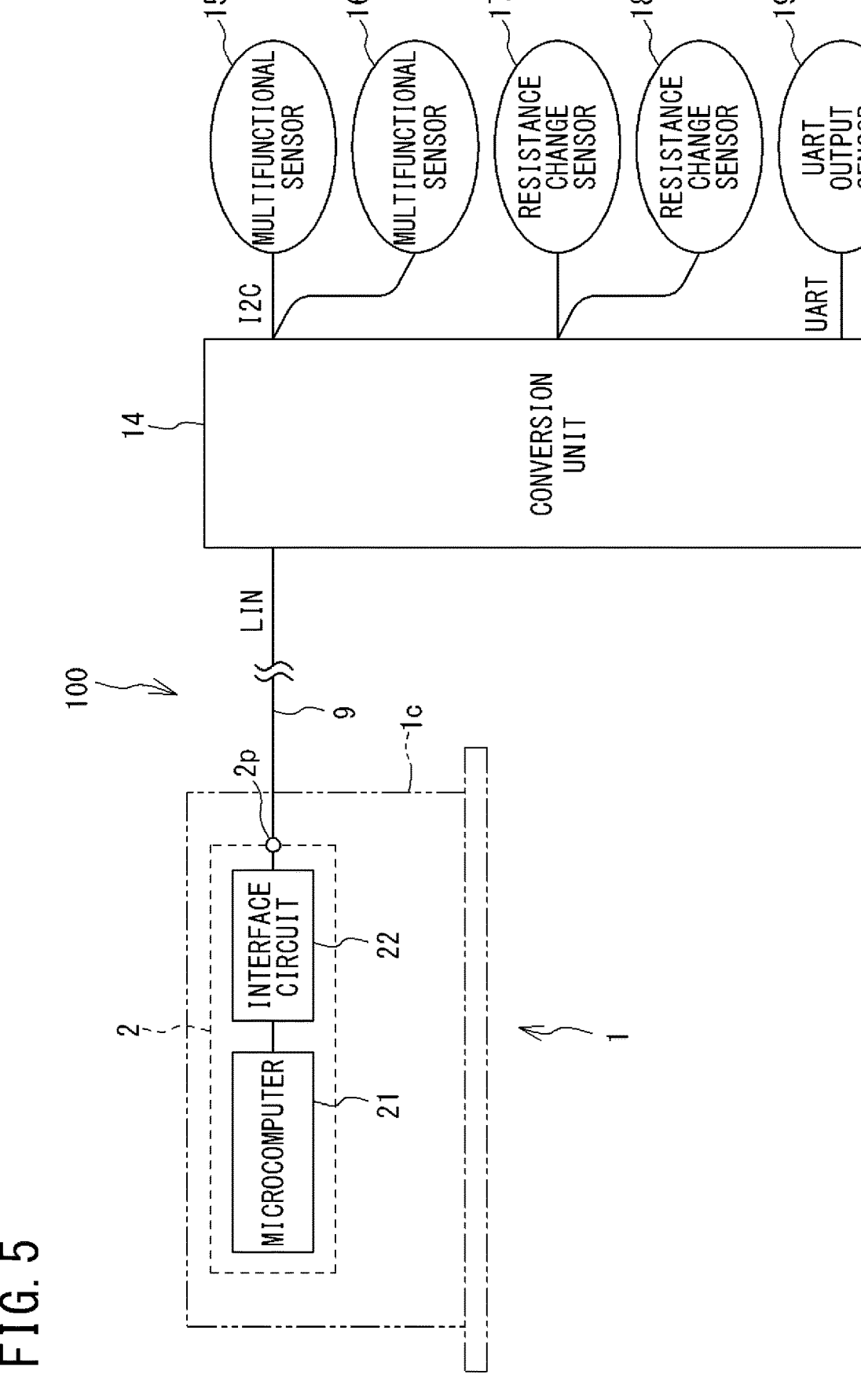
FIG. 5 is a connection diagram illustrating a third embodiment of an air treatment apparatus from the viewpoint of sensor connections.

FIG. 5 is a connection diagram illustrating a third embodiment of an air treatment apparatus 100 from the viewpoint of sensor connections. The air treatment apparatus 100 illustrated in FIG. 5 is different from the air treatment apparatus 100 illustrated in FIG. 1 in a respect that a sensor-side conversion unit 14 has conversion functions compatible with different output types. For example, the conversion unit 14 is connected, in parallel, to multifunctional sensors 15 and 16 each configured to output a signal in conformity with the I2C, resistance change sensors 17 and 18 each configured to indicate a detection level based on a change in resistance, and a UART output sensor 19 configured to output a signal in conformity with the UART.

The conversion unit 14 can be manufactured with a hardware configuration only, but preferably includes a microcomputer. The use of the microcomputer enables conversion, by software, according to an output type of each sensor, and also enables identification of each sensor based on its address. This configuration thus enables connections of multiple sensors of the same type or different types to the conversion unit 14.

Summary of Disclosure

In an I2C, a long communication line from a casing to a sensor outside the casing is likely to cause mixing of external noise.

The foregoing disclosure may be summarized and represented as follows. In the following, the term "first sensor" refers to, for example, each of the sensors 3, 4, 15, and 16 described in the foregoing embodiments. The term "second sensor" refers to, for example, each of the sensors 12 and 13. The term "third sensor" refers to, for example, each of the sensors 17, 18, and 19. The term "conversion unit" refers to each of the conversion units 7 and 8 or the conversion unit 14 described in the foregoing embodiments. The term "first communication standard" refers to, for example, the I2C or the UART, which is a signal standard of a signal to be directly output from a sensor. The term "second communication standard" refers to, for example, the LIN, which is a signal standard higher in tolerance to noise than the "first communication standard". The term "first communication line" refers to, for example, the communication line 5 and 6. The term "second communication line" refers to, for example, the communication line 9 or each of the communication lines 9a and 9b.

Disclosed above is an air treatment apparatus 100 for conditioning air or providing ventilation of air, the air treatment apparatus 100 including a casing 1c of an apparatus main body, a first sensor, a conversion unit, and a main control unit 2. The first sensor is disposed outside the casing 1c and is configured to output a signal in conformity with a first communication standard. The conversion unit is configured to convert the signal output from the first sensor into a signal conforming to a second communication standard higher in tolerance to noise than the first communication standard and to output the signal thus converted. The main control unit 2 is disposed in the casing 1c and is configured to receive the signal output from the conversion unit.

In the air treatment apparatus 100 described above, the conversion unit allows the first sensor to output a signal in conformity with the first communication standard, and allows the main control unit 2 to receive a signal conforming to the second communication standard. The communication line for the second communication standard higher in tolerance to noise than the first communication standard is present on the communication line for signal transmission. This configuration therefore enables reduction in influence of external noise.

In a case where there are first sensors of different types and first communication standards of different types, the conversion unit is designed to be capable of addressing these first sensors and first communication standards, so that the main control unit 2 can be designed based on a common specification.

An influence of external noise can more effectively be reduced particularly when the second communication line from the conversion unit to the main control unit 2 is longer in length than the first communication line from the first sensor to the conversion unit.

For example, the conversion unit includes a microcomputer and converts, with the microcomputer, the signal conforming to the first communication standard into the signal conforming to the second communication standard. Since the conversion unit includes the microcomputer, the air treatment apparatus 100 is capable of facilitating addressing different sensor-side communication standards, by changing a computer program in the conversion unit. In addition, in a case where the air treatment apparatus 100 includes a plurality of sensors which are equal in communication standard to each other or a plurality of sensors some of which are different in communication standard from the remaining sensors, the air treatment apparatus 100 enables conversion corresponding to each communication standard and also enables identification of each sensor based on its address. The air treatment apparatus 100 is therefore capable of facilitating signal conversion according to a sensor. The main control unit 2 has no necessity of design change according to a difference in standard among the sensors.

In the case where the conversion unit includes the microcomputer, the conversion unit is connectable to the main control unit with one communication line (e.g., a flat cable or a multicore cable), which simplifies and facilitates construction.

In a case where the main control unit 2 includes an input port 2p for the second communication standard, the main control unit 2 is capable of receiving, through the input port 2p, the signal output from the conversion unit.

This configuration facilitates connecting the conversion unit and the main control unit 2 at on-site construction.

The conversion unit may convert, with a hardware circuit, the signal conforming to the first communication standard into the signal conforming to the second communication standard.

In this case, the conversion unit is used for only the specific first sensor. This configuration however eliminates a necessity of software design to be required in a case where a microcomputer is used.

The air treatment apparatus 100 may further include second sensors each disposed on or in the casing 1c and configured to output a signal in conformity with the first communication standard. The main control unit 2 includes input ports 2p3 and 2p4 to be connected to the second sensors.

This configuration enables direct connections between the main control unit 2 and the various sensors located near the main control unit 2, in addition to connections between the main control unit 2 and the various sensors with conversion units interposed therebetween. This configuration also enables sensor connections conforming to the first communication standards of different types inside and outside the casing 1c.

The conversion unit and the first sensor may constitute a single sensor unit.

In this case, specifically, the conversion unit and the first sensor are mounted on a single substrate or are accommodated in a single casing. This configuration thus causes the conversion unit and the first sensor to come close to each other and to be fixed physically, thereby more effectively reducing an influence of external noise between the conversion unit and the first sensor.

A third sensor (e.g., the sensors 17, 18, and 19 in FIG. 5) configured to output a signal in conformity with the first communication standard may be connected to a conversion unit 14 in parallel with the first sensor e.g., the sensors 15 and 16 in FIG. 5).

This configuration thus enables connections of multiple sensors of the same type or different types to the conversion unit.

Others

The foregoing casing 1*c* has been described as the casing of the indoor unit 1. However, a base body that accepts the same sensor connections may be a casing of an outdoor unit or a casing of an indoor unit and outdoor unit-integrated air conditioner.

In each of the foregoing embodiments, the communication standard such as the LIN may be a controller area network (CAN).

In each of the foregoing embodiments, the indoor unit of the air conditioner has been exemplified as an air treatment apparatus; however, the same sensor connections are applicable to a ventilation device.

Supplementary Note

The foregoing embodiments may be at least partially combined with each other in a given manner.

While various embodiments have been described herein above, it is to be appreciated that various changes in form and detail may be made without departing from the spirit and scope presently or hereafter claimed.

REFERENCE SIGNS LIST

1 indoor unit
1*c* casing
2 main control unit
2*p*, 2*p*1, 2*p*3, 2*p*4 input port
3, 4 sensor
5, 6 communication line
7, 8 conversion unit
9, 9*a*, 9*b* communication line
10, 11 sensor unit
12, 13 sensor
14 conversion unit
15, 16 multifunctional sensor
17, 18 resistance change sensor
19 UART output sensor
21 microcomputer
22 interface circuit
22*a*, 22*b*, 22*c*, 22*d* conversion circuit
71 microcomputer
72, 73, 74, 75 conversion circuit
100 air conditioner (air treatment apparatus)
101 heat exchanger
102 fan
103 expansion valve
200 outdoor unit
201 compressor
202 four-way switching valve
203 accumulator
204 heat exchanger
205 fan

206 expansion valve
207 interruption valve (liquid side)
208 interruption valve (gas side)

The invention claimed is:

1. An air treatment apparatus for conditioning air or providing ventilation of air, the air treatment apparatus comprising:

a casing of an apparatus main body;

a first sensor disposed outside the casing and configured to output a signal in conformity with a first communication standard;

a conversion unit configured to convert the signal output from the first sensor into a signal conforming to a second communication standard higher in tolerance to noise than the first communication standard and to output the signal thus converted; and a main control unit disposed in the casing and configured to receive the signal output from the conversion unit, wherein the conversion unit includes a first conversion circuit configured to convert the signal conforming to the first communication standard into a signal conforming to a third communication standard that is different from the first communication standard and the second communication standard, and a second conversion circuit configured to convert the signal conforming to the third communication standard into the signal conforming to the second communication standard.

2. The air treatment apparatus according to claim 1, wherein a second communication line from the conversion unit to the main control unit is longer in length than a first communication line from the first sensor to the conversion unit.

3. The air treatment apparatus according to claim 1, wherein the conversion unit includes a microcomputer and converts, with the microcomputer, the signal conforming to the first communication standard into the signal conforming to the second communication standard.

4. The air treatment apparatus according to claim 1, wherein the main control unit includes an input port for the second communication standard and receives, through the input port, the signal output from the conversion unit.

5. The air treatment apparatus according to claim 1, further comprising a second sensor disposed on or in the casing and configured to output a signal in conformity with the first communication standard, wherein the main control unit includes an input port to be connected to the second sensor.

6. The air treatment apparatus according to claim 1, wherein the conversion unit and the first sensor constitute a single sensor unit.

7. The air treatment apparatus according to claim 1, further comprising a third sensor connected to the conversion unit in parallel with the first sensor and configured to output a signal in conformity with the first communication standard.

8. The air treatment apparatus according to claim 1, wherein the first conversion circuit is configured by solely of a hardware circuitry, and the second conversion circuit is configured by solely of a hardware circuitry.

9. The air treatment apparatus according to claim 1, wherein the first conversion circuit is configured by solely of a hardware circuitry, and the second conversion circuit is configured by a micro- computer. 5

10. The air treatment apparatus according to claim 1, wherein the conversion unit converts, with a hardware circuit, the signal conforming to the first communication standard 10 into the signal conforming to the second communication standard.

* * * * *